United States Patent [19]
Kessler et al.

[11] 3,899,564
[45] Aug. 12, 1975

[54] METHOD OF MAKING PLASTIC-COATED WIRE OBJECTS SUCH AS INTRAUTERINE CONTRACEPTIVE DEVICES

[76] Inventors: Milton Kessler, 6690 Harrington Ave., Youngstown, Ohio 44512; Ronald N. Kessler, 4551 Woodhurst, Apt. 3, Youngstown, Ohio 44515

[22] Filed: Nov. 15, 1973

[21] Appl. No.: 416,221

[52] U.S. Cl. ............... 264/255; 264/275; 264/279; 264/295; 264/328; 264/339
[51] Int. Cl. ........................... B29c 3/00; B29f 1/10
[58] Field of Search ........... 264/255, 250, 294, 296, 264/263, 271, 248, 275, 320, 322, 331, 339, 295, 279, 249

[56] References Cited
UNITED STATES PATENTS

| | | | |
|---|---|---|---|
| 1,219,254 | 3/1917 | Clulee | 264/271 |
| 1,479,148 | 1/1924 | Mastin | 264/271 |
| 2,230,289 | 2/1941 | Dodge | 264/271 |
| 2,403,815 | 7/1946 | Martin | 264/271 |
| 2,436,984 | 3/1948 | Wilson | 264/328 |
| 2,507,496 | 5/1950 | Bond | 264/271 |
| 3,467,089 | 9/1969 | Hasson | 128/130 |
| 3,811,435 | 5/1974 | Soichet | 128/130 |

*Primary Examiner*—Robert F. White
*Assistant Examiner*—Willard E. Hoag
*Attorney, Agent, or Firm*—Max L. Libman

[57] ABSTRACT

In uniformly mold-coating with plastic, a relatively short, thin object of springy wire which is not always perfectly straight (and therefore difficult to keep centered in a mold), a two-step method is described by which the plastic coat is made in two stages; in the first stage the lower half of the coat is molded including an elongated groove for reception of the wire, with upstanding foldable members of plastic material left projecting upwardly on both sides of the groove, then the wire is laid into the groove, and frictionally retained therein by the upstanding members, and finally a second molding operation with a top mold shaped like the desired upper half of the mold is employed to force the upstanding members down over the wire from both sides simultaneously and complete the process, leaving the wire completely coated in the center of the plastic.

3 Claims, 11 Drawing Figures

METHOD OF MAKING PLASTIC-COATED WIRE OBJECTS SUCH AS INTRAUTERINE CONTRACEPTIVE DEVICES

A highly successful intrauterine contraceptive device (hereinafter called IUD) is a modification of a device shown in U.S. Pat. No. 3,507,274 to Samuel Soichet, from which it differs in that the wire base of the device is a V-shaped thin wire member instead of a Y-shaped one as shown in the patent. However, a problem has developed in the manufacture of the devices, since, due to the highly springy nature of the stainless steel wire which forms the elastic element of the device, and which must be preformed into its desired V-shape before the plastic coating is applied, it has turned out to be very difficult to uniformly center the spring member within the plastic coating. At present, the device is therefore made by drawing thin tubular sleeves of plastic material over the wire by hand, or extruded plastic or rubber over the wire which is laborious and expensive, and makes it difficult to manufacture the device in the needed quantities. Efforts have been made to use mass-production molding techniques whereby the plastic is molded around the wire, but due to the springy nature of the stainless steel wire, it has proved very difficult to properly center the wire within the mold so as to insure that it will be uniformly coated with the plastic material. The present invention is directed to a two-step molding method which obviates this difficulty and has resulted in uniformly coated devices as will be described below.

The specific nature of the invention, as well as other objects and advantages thereof, will clearly appear from a description of a preferred embodiment as shown in the accompanying drawings, in which.

Figure 1:
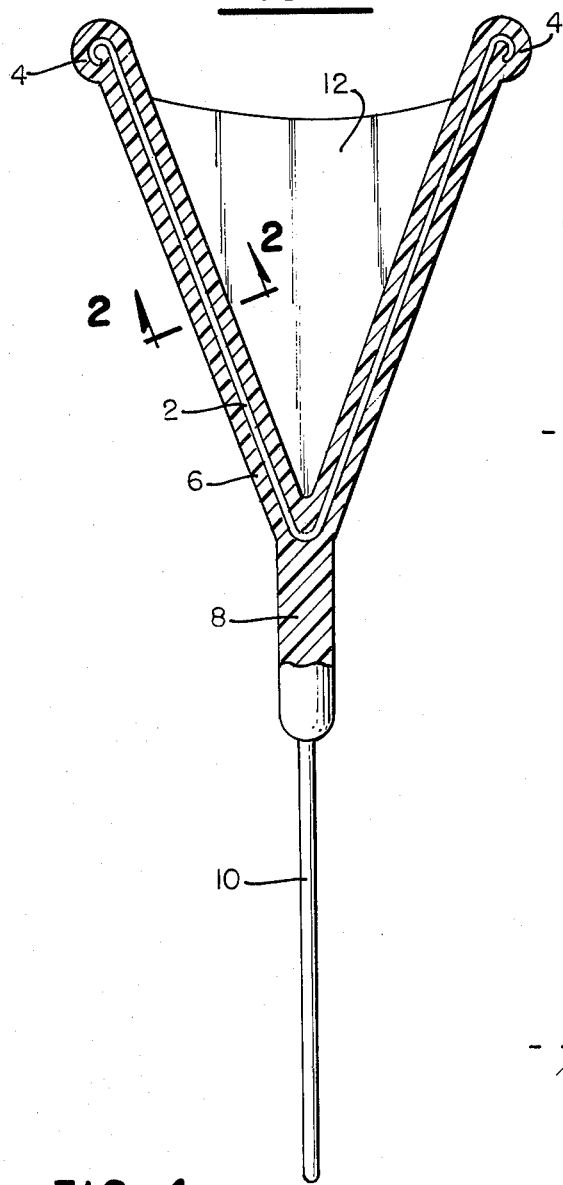
FIG. 1 is a central sectional view of a device made according to the new method.

This invention is directed to the solution of a problem which arose in the manufacture of the above-described IUD, and particularly the form which is also described in an article appearing in the AMERICAN JOURNAL OF OBSTETRICS AND GYNECOLOGY, St. Louis, Vol. 114, No. 7, Pages 938–941, Dec. 1, 1972, and particularly the modification shown in FIG. 1 (page 939) as Model C. The device consists of a V-shaped core element 2 made of medical grade stainless steel terminating at the end of the V in small loop portions 4, the V-element being completely encased in a covering of medical grade silicone rubber 6 in which the loops 4 are embedded to form two small buttons or enlarged nodes, while extending down from the bottom of the V-junction is a tail portion 8, preferably terminating in a smaller diameter tail portion 10. A thin web of silicone integral with the rest of the structure extends between the lower portion of the V-legs as shown at 12.

Simple as this device appears to be, it has proven to be very difficult to manufacture by mass-production molding techniques, due to the springy nature of the stainless steel wire core, since it is very difficult to keep this accurately centered in a mold so that the plastic material can be uniformly distributed around it. If the metal shows through to the surface, then the device is unacceptable, since the metal apparently irritates the human tissue with which it is in contact. One effort to obviate this difficulty was by means of a two-step process whereby in the first step small beads or nodes were molded around portions of the V-shaped element 2 while it was held centered at the remaining portions in the mold. After this, the V-element with its applied nodes or buttons was placed into a full mold, and plastic molded around the entire structure, the idea being that the small nodes would keep the spring wire centered in the mold, but the resilience of the spring wire defeated these efforts and they were unsuccessful.

Figure 2:
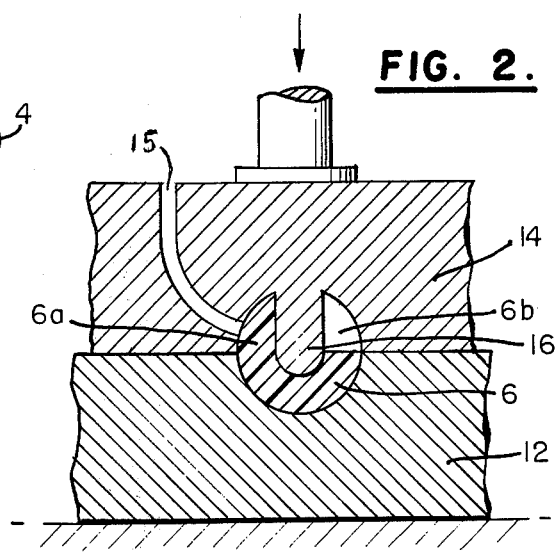
FIG. 2 is a cross-sectional view taken on line 2—2 of FIG. 1 showing the first stage of the molding process, in which the bottom half of the plastic element is formed together with the upwardly extending side members.
Figure 3:
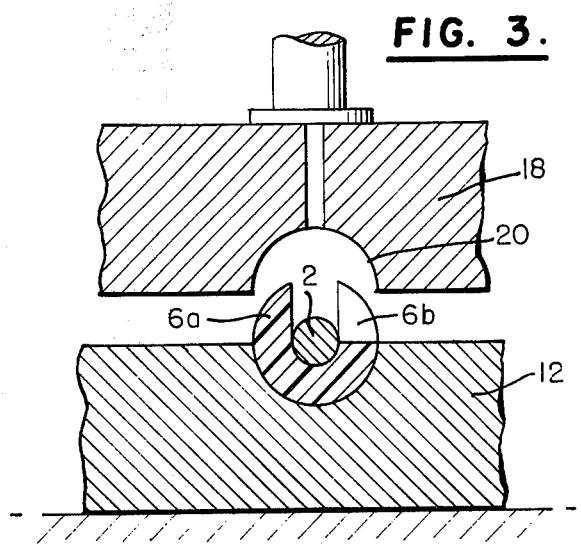
FIG. 3 is a view similar to FIG. 2, taken on line 3—3 of FIG. 4, with the upper half of the mold replaced by another mold piece in partly separated condition, showing the manner in which the bottom half remains in its part of the mold.
Figure 4:
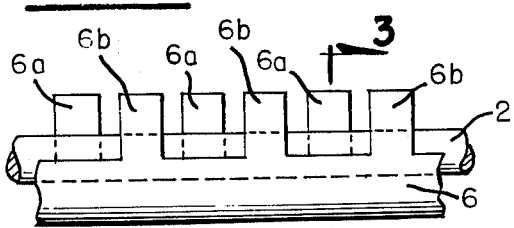
FIG. 4 is a side view of the element in the condition shown in FIG. 3, showing the bottom half together with the upstanding side members.
Figure 5:
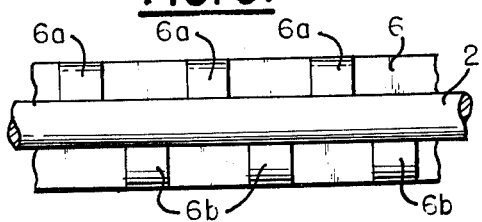
FIG. 5 is a top or plan view of the portion shown in FIG. 4.

In accordance with the present invention, a two-stage molding process is shown. The first stage is shown in FIG. 2, wherein a two-part mold is used having a bottom part 12 with a linear cavity conforming exactly to the bottom half of the plastic element which is to be the final coating 6. The upper part of the mold 14 is provided with a rigid downwardly protruding male member 16 which is rounded at its bottom to form the bottom half of the groove for receiving the wire 2, and is also provided with a series of cavities to form upstanding elements 6a and 6b alternately staggered along the length of the plastic element as best shown in FIGS. 4 and 5. The mold is supplied with plastic material under heat and pressure in conventional fashion through a series of sprues, one of which is schematically indicated at 15. It will be seen that elements 6a and 6b extend up on both sides of the central cavity which will receive the wire 2 and which is shown in place in FIGS. 3 and 4 (somewhat like the fingers of the two hands when they are about to be clasped together). The upper mold is now withdrawn, and is replaced by second upper mold 18 (FIG. 3) having a central cavity 20 conforming exactly to the desired outer shape of the plastic coating. The wire 2 is now put in place as shown in FIG. 3, it being understood that FIG. 3 shows only one leg of the entire element as indicated in section 2—2 of FIG. 1, and that the mold is actually shaped to conform to the entire structure. It will be understood that the bottom part of the mold which forms elements 8 and 10 presents no problem, this being made by the usual molding technique, but since it does not have a central wire, the plastic remains in place without any problem.

Figure 6:
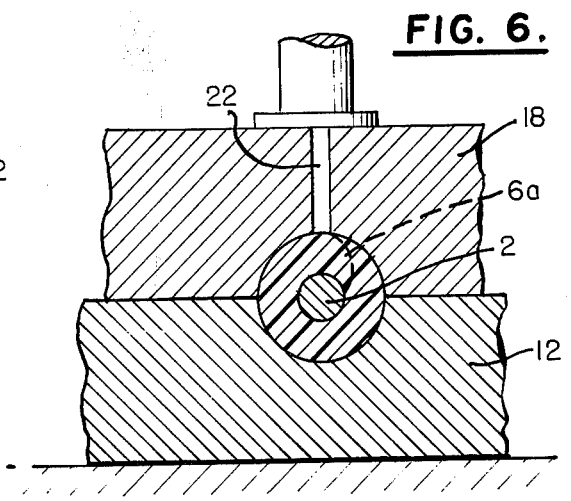
FIG. 6 shows a view of the final molding step by which the completed product is formed after the last shot of plastic material is injected.
Figure 11:
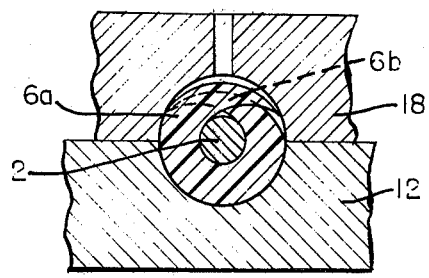
FIG. 11 shows the final molding step with the side members folded over the inserted wire.

Upper mold 18 is now forced down into the position shown in FIG. 11, causing the upstanding flexible elements 6a and 6b to fold inwardly around and over the wire 2, as shown in FIG. 11, and causing said elements to interdigitate so that there is no possibility of its becoming displaced or coming into contact with the side of the mold and thus being exposed. Since the fingers 6a and 6b do not completely fill all of the available space in the upper mold, additional plastic is now injected in any known manner indicated symbolically by a sprue 22 (FIG. 6) to complete the coating of the IUD. The wire core may first be treated with a suitable primer such as Dow Corning XF3-6017, to improve adhesion of the plastic, which is like a liquid of fairly low viscosity when injected, and permeates all of the spaces between the folded-over flexible elements 6a and 6b, as well as filling any space left around the wire 2, to thus produce a solid plastic coating around the wire.

Figure 7:
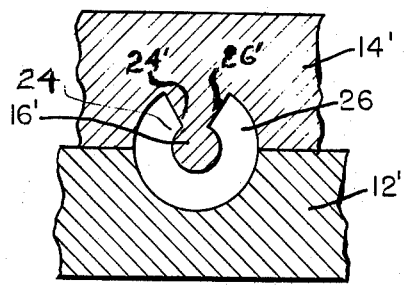
FIG. 7 is a cross-sectional view generally similar to FIG. 2 of a modified form of the invention.
Figure 8:
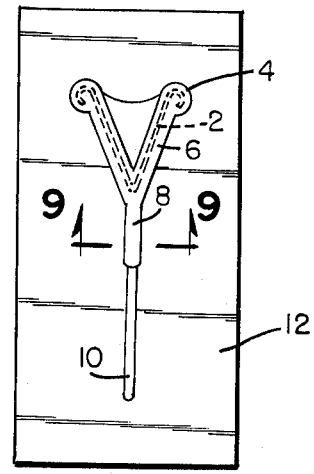
FIG. 8 is a plan view of the lower mold containing the final product before it is removed from the mold.
Figure 9:
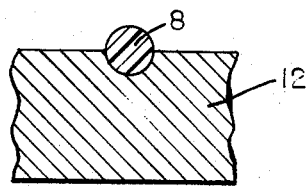
FIG. 9 is a sectional view taken on line 9—9 of FIG. 8.

FIG. 7 shows another form of the invention, in which the mold elements 12' and 14' correspond to those in FIG. 2, and the bottom mold is exactly the same as in FIG. 2. However, the upper mold is shaped to provide two upstanding elements 24 and 26 which are not interrupted like elements 6a and 6b, but are continuous and run along the entire length of the device. These have the advantage that it is easier to make the molds in this fashion by simply making straight cuts, rather than cutting out individual mold sections for the elements 6a and 6b. In this case, the material is so calculated that after mold 14' is withdrawn, and the central wire 2 is put into place, the second step can be exactly the same as shown in FIG. 11, and the amount of material in upstanding members 24 and 26 is calculated to be exactly sufficient for the desired purpose so that the two elements are joined without the addition of any further material to form the complete coating. However, they may instead be so designed that a small gap is left between them which can be filled with additional plastic material, in which case it is not necessary to be as accurate in the design of elements 24 and 26 to insure that exactly the correct amount of material is provided. It will be noted that the design of FIG. 7 provides small outstanding projections 24' and 26' which serve to firmly hold the wire 2 in place, so that it can be readily inserted either manually or by suitable machinery. Once the wire is held in place, the projections 24', 26' prevent it from springing out of place.

Figure 10:
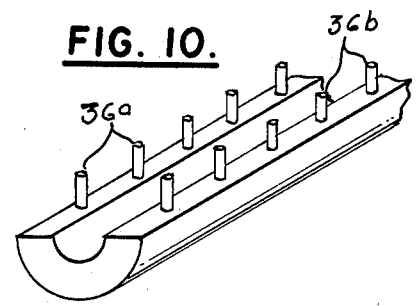
FIG. 10 shows another modified form of the invention.

FIG. 10 shows another modification in which the foldable studs are in the form of pins 36a and 36b, corressponding to studs 6a and 6b and functioning in the same manner. This has the advantage that the upper mold is easier to make, requiring only drilling of holes in it.

The wire 2 is shown around in cross-section, but may also be of any other cross-sectional shape, e.g., square. It must be springy to perform its spreading function, but may be of other inert materials, e.g., Monel Metal, copper-coated steel, rigid plastic, etc.

We claim:

1. Method of making an IUD comprising a V-shaped portion having a springy, soft-plastic-coated metal wire core and a soft-plastic tail portion extending away from the apex of the V comprising a. molding at least the bottom half of the plastic tail and a bottom plastic part of the V-shaped portion in a two-part die having a cavity in the bottom half of the die corresponding to the entire bottom half of the plastic coat, the upper half of the two-piece die having a male projection rounded at its end to produce in the center of said plastic coat portion a depression corresponding to the bottom half of the wire to be coated, said upper half having also recesses to produce upstanding foldable members of plastic material projecting upwardly on both sides of said depression, b. withdrawing the upper half of the die, leaving in the bottom half the plastic element thus formed, which constitutes a tail portion and a bottom part of the V-portion, said last part having a central V-shaped depression corresponding to the lower half of the wire core of the IUD, and said foldable members extending up from said bottom part on either side of said depression, c. placing the V-shaped metal wire core of the IUD in said depression so that it lies on the bottom thereof with said foldable members extending upwardly on either side of the wire to prevent its displacement, d. replacing the upper half of the die with a second upper half die having an elongated cavity corresponding to the upper half of the product and forcing said second half die down into engagement with the lower half die so that its elongated cavity portion folds said foldable members inwardly over and around the top part of the wire to securely position the wire within the plastic and cause said members to interdigitate, f. and injecting more plastic material through said upper half die to completely surround and enclose the wire and complete forming the IUD.

2. The invention according to claim 1, said studs being made in the form of wedge-shaped members with the point of each wedge extending upwardly.

3. The invention according to claim 1, said studs being made in the form of short upwardly extending cylindrical members.

* * * * *